(12) United States Patent
Siegel et al.

(10) Patent No.: US 10,427,618 B2
(45) Date of Patent: Oct. 1, 2019

(54) UNIVERSAL MECHANICAL DOCK

(71) Applicant: Panasonic Automotive Systems Company of America, division of Panasonic Corporation of North America, Peachtree City, GA (US)

(72) Inventors: J. Scott Siegel, Rochester Hills, MI (US); Patrick Hanslits, Clarkston, MI (US); Andrew Bianchi, Pleasant Ridge, MI (US)

(73) Assignee: Panasonic Automotive Systems Company of America, division of Panasonic Corporation of North America, Peachtree City, GA (US)

( * ) Notice: Subject to any disclaimer, the term of this patent is extended or adjusted under 35 U.S.C. 154(b) by 84 days.

(21) Appl. No.: 15/896,728

(22) Filed: Feb. 14, 2018

(65) Prior Publication Data

US 2018/0236947 A1 Aug. 23, 2018

Related U.S. Application Data

(60) Provisional application No. 62/460,955, filed on Feb. 20, 2017.

(51) Int. Cl.
| | |
|---|---|
| *G06F 1/16* | (2006.01) |
| *B60R 11/02* | (2006.01) |
| *H04M 1/06* | (2006.01) |
| *H04M 1/04* | (2006.01) |
| *B60R 11/00* | (2006.01) |

(52) U.S. Cl.
CPC ............ *B60R 11/02* (2013.01); *G06F 1/1632* (2013.01); *H04M 1/04* (2013.01); *H04M 1/06* (2013.01); *B60R 2011/0075* (2013.01); *B60R 2011/0089* (2013.01); *B60R 2011/0294* (2013.01)

(58) Field of Classification Search
None
See application file for complete search history.

(56) References Cited

U.S. PATENT DOCUMENTS

| | | | | |
|---|---|---|---|---|
| 7,062,300 | B1 * | 6/2006 | Kim | B60R 11/0241 379/454 |
| 8,242,906 | B2 * | 8/2012 | Fawcett | A47F 7/024 340/568.2 |
| 8,827,341 | B2 * | 9/2014 | Sofield | B60R 11/02 296/37.12 |
| 9,434,319 | B2 * | 9/2016 | Oldani | B60R 11/02 |
| 9,468,122 | B2 * | 10/2016 | Woodward | F21V 21/00 |
| 9,567,776 | B2 * | 2/2017 | Moock | E05B 73/0082 |
| 2008/0169923 | A1 * | 7/2008 | Belden | A47F 7/024 340/568.3 |

(Continued)

*Primary Examiner* — Xanthia C Cunningham
(74) *Attorney, Agent, or Firm* — Laurence S. Roach, Esq.

(57) ABSTRACT

A docking system is for docking an electronic device in a motor vehicle. The docking system includes a cradle having a pivotable arm with an internal channel carrying first electrical conductors electrically connected to the electronic device. The cradle securely retains the electronic device. A dock housing includes a recess receiving the arm of the cradle such that the first electrical conductors may be electrically connected to second electrical conductors in the motor vehicle. A latch releasably latches the arm of the cradle within the recess of the dock housing.

12 Claims, 12 Drawing Sheets

(56) References Cited

U.S. PATENT DOCUMENTS

| | | | |
|---|---|---|---|
| 2010/0108828 A1* | 5/2010 | Yu | F16M 11/041 |
| | | | 248/123.11 |
| 2012/0002355 A1* | 1/2012 | Chen | B60R 11/02 |
| | | | 361/679.01 |
| 2012/0018473 A1* | 1/2012 | Da Costa Pito | B60R 11/02 |
| | | | 224/282 |
| 2012/0318937 A1* | 12/2012 | Carnevali | F16M 11/041 |
| | | | 248/122.1 |
| 2014/0097320 A1* | 4/2014 | Rizk | F16M 11/14 |
| | | | 248/475.1 |
| 2014/0362517 A1* | 12/2014 | Moock | E05B 73/0082 |
| | | | 361/679.43 |

* cited by examiner

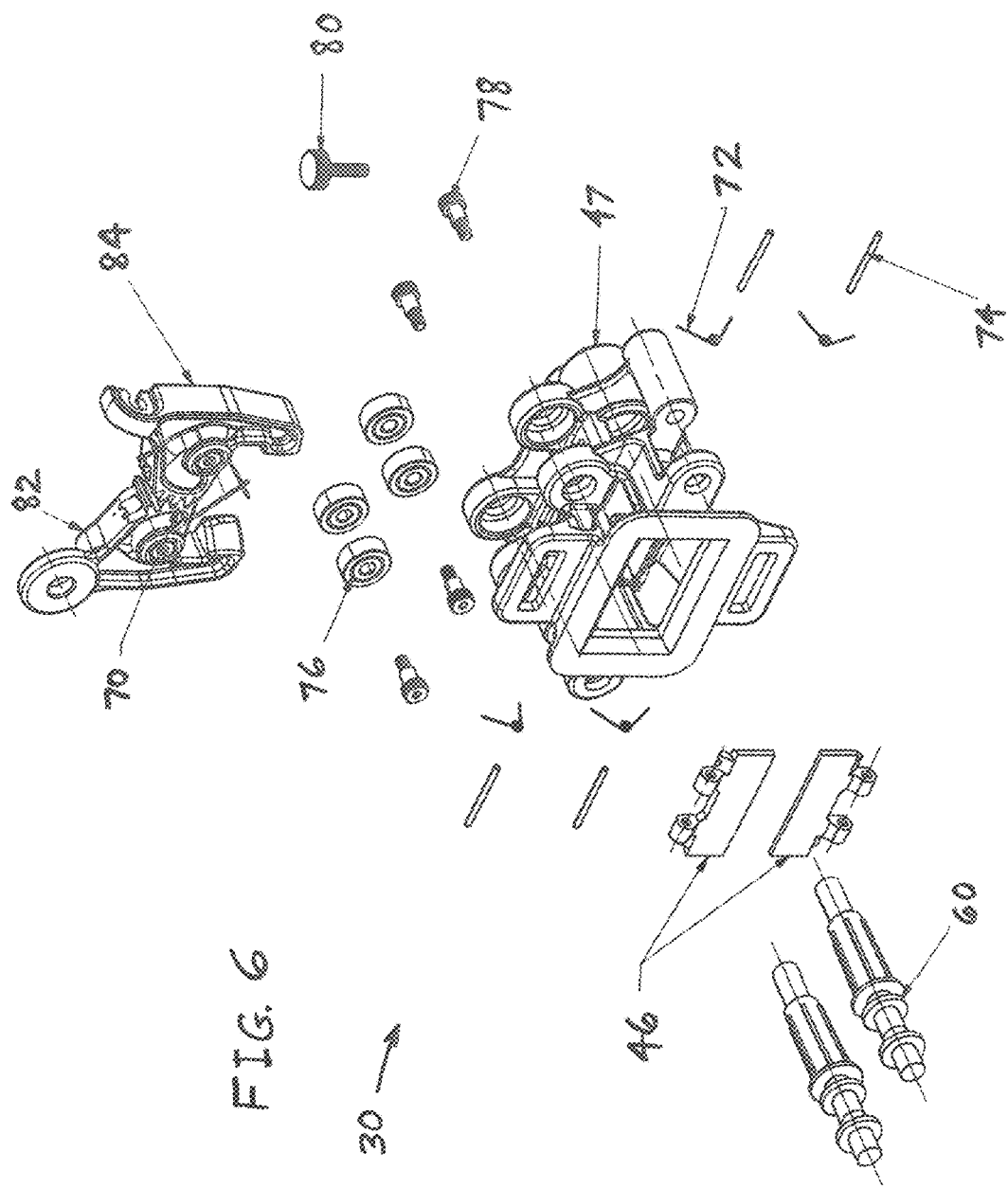

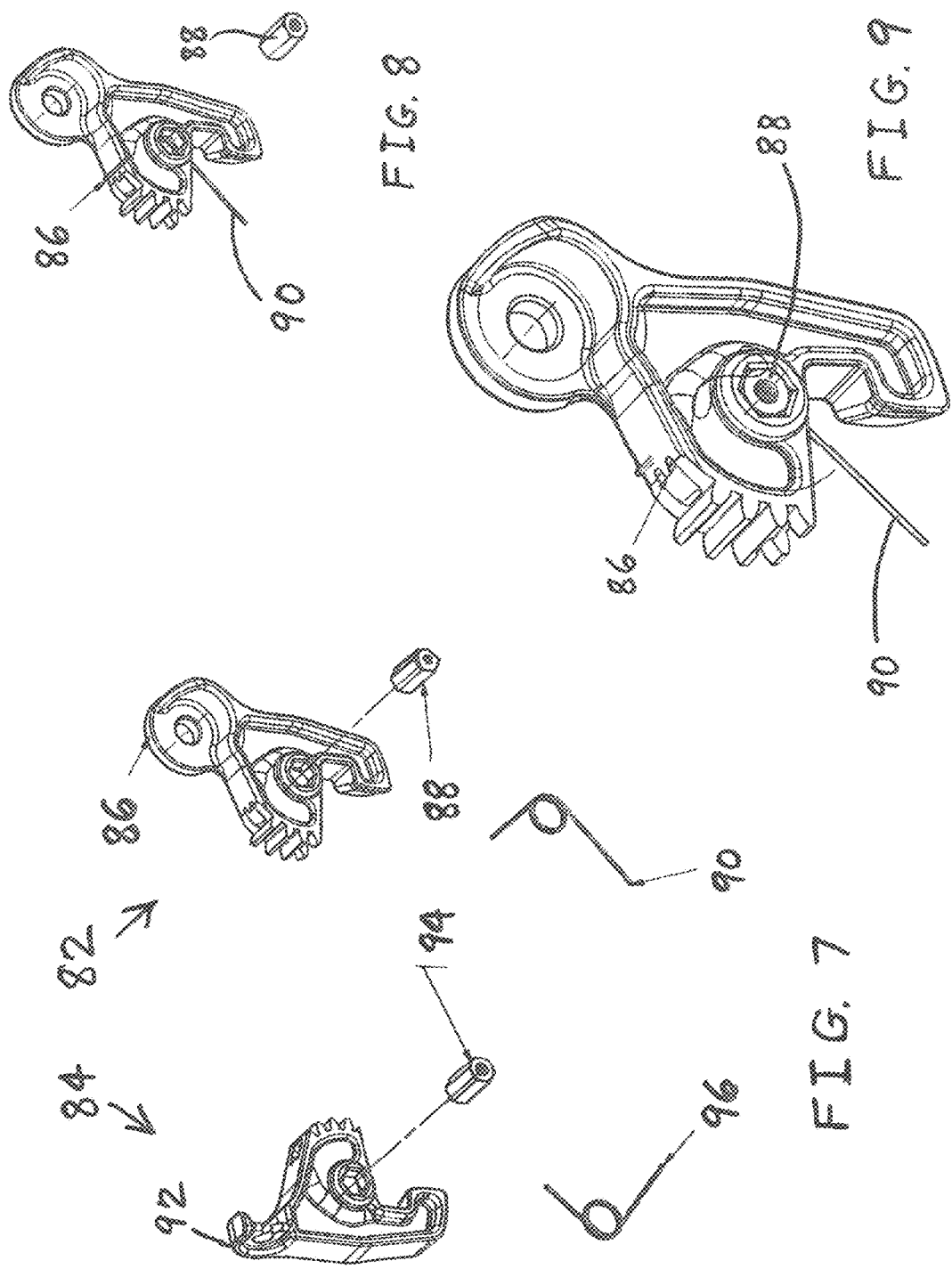

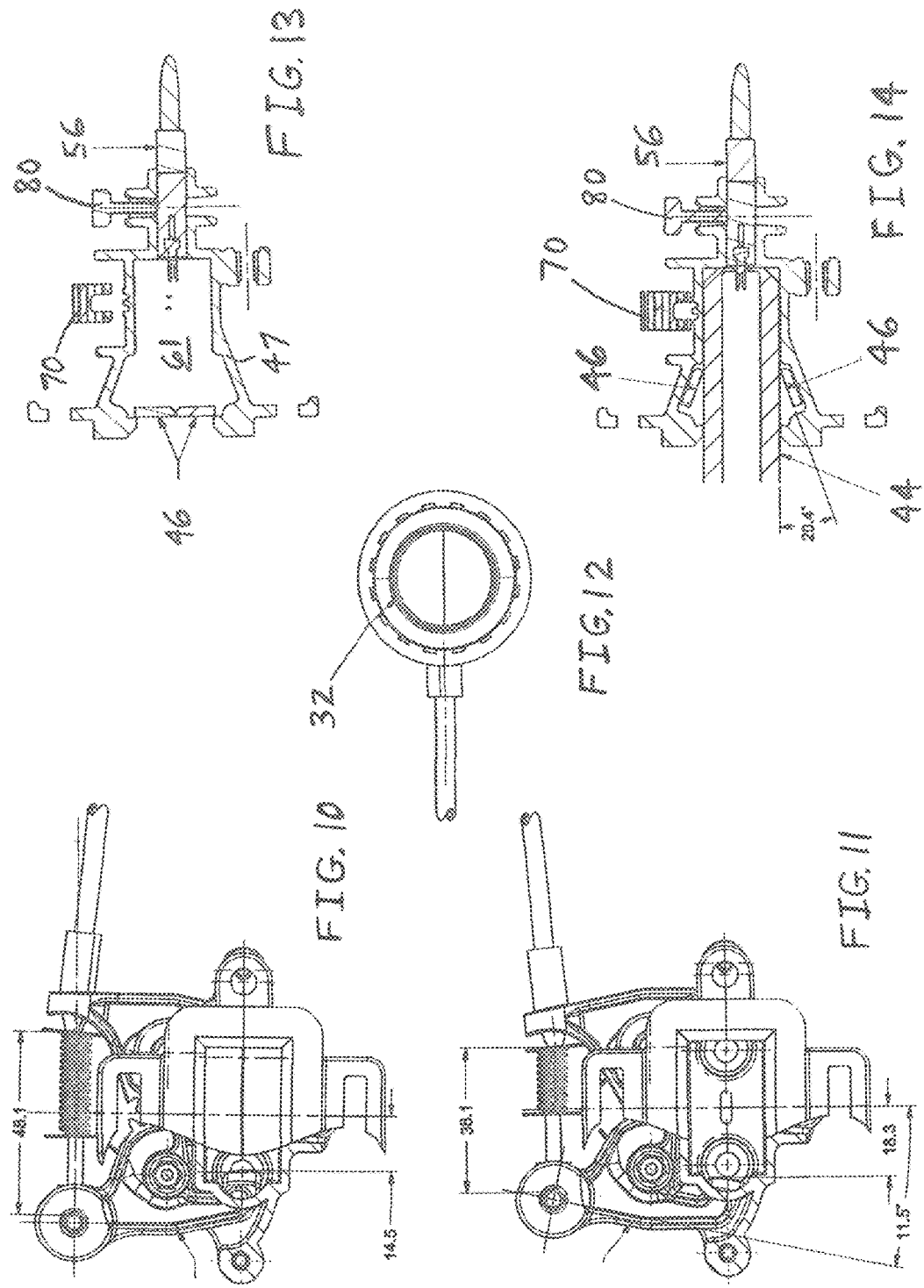

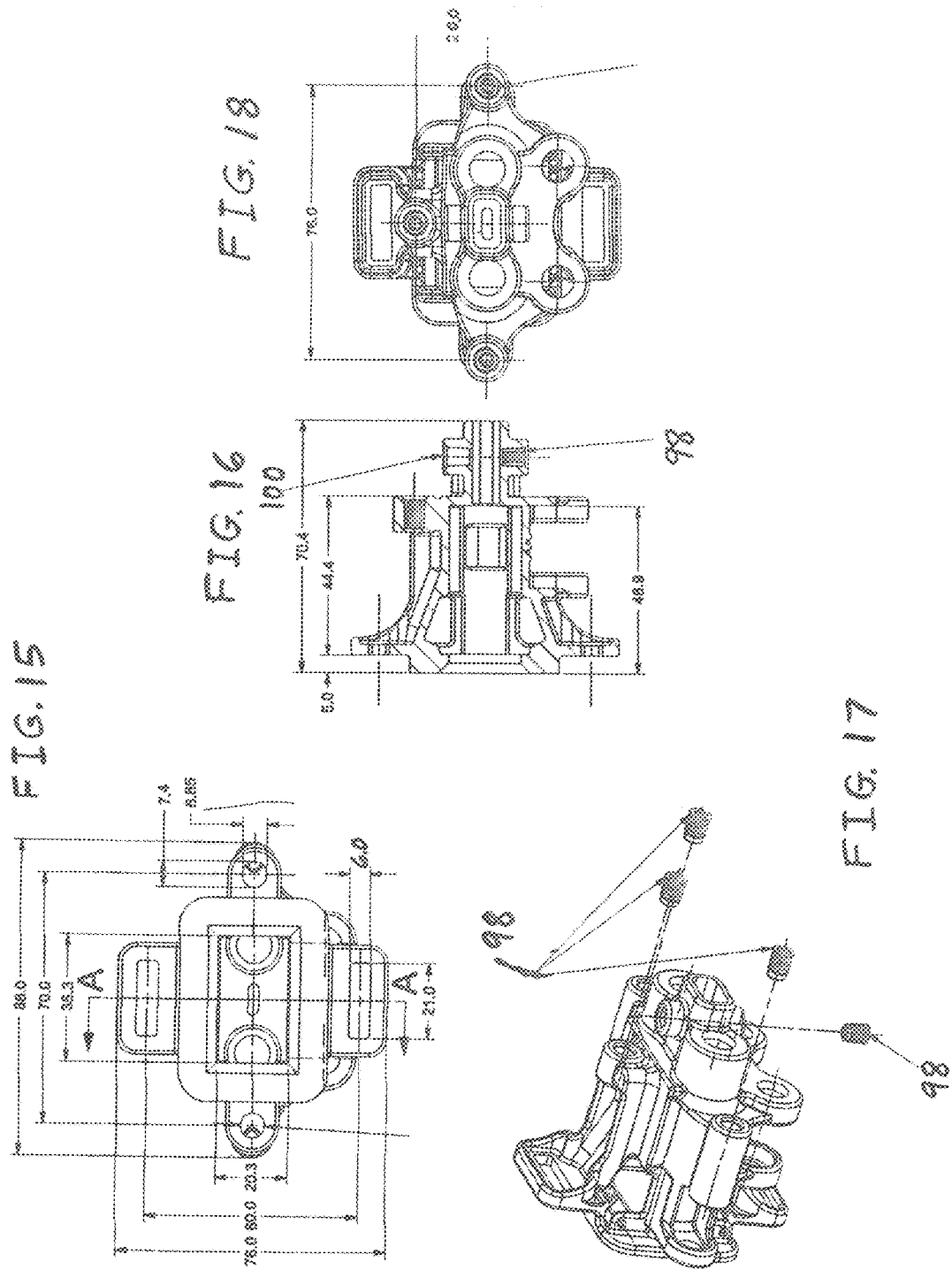

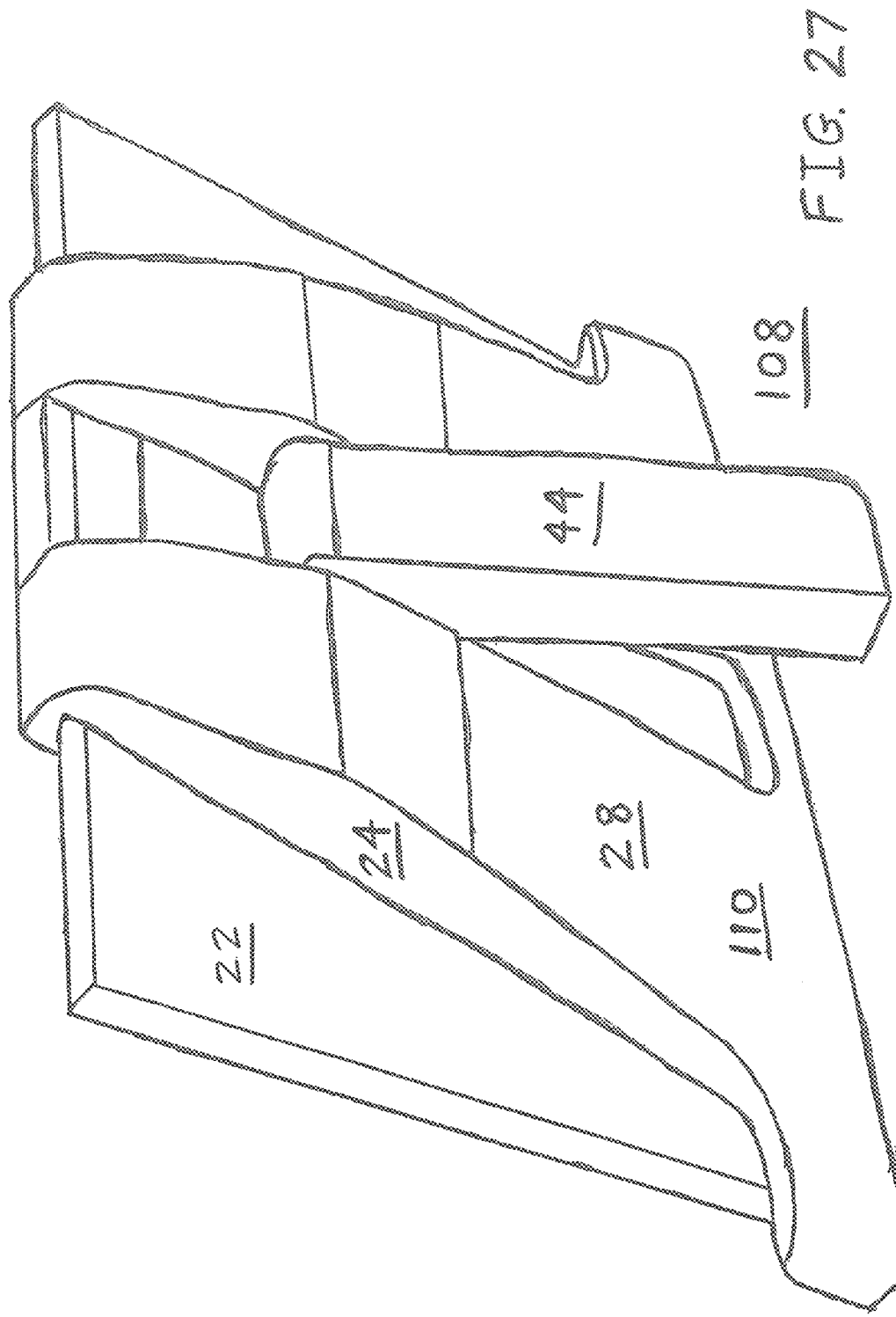

UNIVERSAL MECHANICAL DOCK

CROSS-REFERENCE TO RELATED APPLICATION

This application claims the benefit of U.S. Provisional Application No. 62/460,955, filed on Feb. 20, 2017, which the disclosure of which is hereby incorporated by reference in its entirety for all purposes.

FIELD OF THE INVENTION

The disclosure relates to a docking system, and, more particularly, a docking system in a motor vehicle.

BACKGROUND OF THE INVENTION

Electronic devices are typically permanently installed in a motor vehicular. This practice, however, limits flexibility in updating the electronic devices during the course of the vehicle's lifetime, which may last ten years or more.

SUMMARY

The present invention may provide an upgadeable port for accommodating new devices to customize a motor vehicle for multiple uses and changing needs. More specifically, the present invention may provide an automotive universal mechanical docking system for mounting various devices including displays, touchscreens, controls for HVAC and audio, dome lights, lighting, telephones, tablets and other devices that are brought into the vehicle by the user. The dock may provide power and data to the devices via USB-C, high-definition multimedia interface (HDMI) or other connections.

In one embodiment, the invention comprises a docking system for docking an electronic device in a motor vehicle. The docking system includes a cradle having a pivotable arm with an internal channel carrying first electrical conductors electrically connected to the electronic device. The cradle securely retains the electronic device. A dock housing includes a recess receiving the arm of the cradle such that the first electrical conductors may be electrically connected to second electrical conductors in the motor vehicle. A latch releasably latches the arm of the cradle within the recess of the dock housing.

In another embodiment, the invention comprises an automotive docking system for docking an electronic device in a motor vehicle. The docking system includes a cradle having an arm with an internal channel carrying first electrical conductors electrically connected to the electronic device. A distal end of the arm includes a throughhole in communication with the internal channel. The throughhole has a first width that is less than a second width of the channel. The cradle securely retains the electronic device. A dock housing includes a recess receiving the arm of the cradle. A latch releasably latches the arm of the cradle within the recess of the dock housing. Second electrical conductors are at least partially carried in a dashboard of the motor vehicle. Distal ends of the second electrical conductors are attached to and electrically connected to an electrical connector that extends through the throughhole and that is electrically connected to the first electrical conductors.

In yet another embodiment, the invention comprises a docking system for docking an electronic device in a motor vehicle. The docking system includes a cradle having an arm with an internal channel carrying first electrical conductors electrically connected to the electronic device. The cradle securely retains the electronic device. A dock housing includes a recess receiving the am of the cradle such that the first electrical conductors may be electrically connected to second electrical conductors in the motor vehicle. A latch latches the the arm of the cradle within the recess of the dock housing. A release actuator is mechanically coupled to the latch and releases the arm of the cradle from the latch in response to the release actuator being manually actuated.

An advantage of the present invention is that, instead of having to permanently install devices in a vehicle, the universal port enables various devices to be plugged in to the vehicle and swapped out when desired.

BRIEF DESCRIPTION OF THE DRAWINGS

A better understanding of the present invention will be had upon reference to the following description in conjunction with the accompanying drawings.

FIG. 6 is an exploded, perspective view of the dock assembly of the docking system of FIG. 1.

FIG. 7 is an exploded, perspective view of the left hand and right hand latch arm assemblies of FIG. 6.

FIG. 8 is a view similar to FIG. 7, but with the spring loaded onto the latch-dock slam arm.

FIG. 9 is a view similar to FIG. 8, but with the standoff loaded through the spring.

FIG. 10 is a front, partially cross-sectional view of the dock assembly of the docking system of FIG. 1 with the latch engaged.

FIG. 11 is a front, partially cross-sectional view of the dock assembly of the docking system of FIG. 1 with the latch disengaged.

FIG. 12 is a front view of the pushbutton release actuator of the docking system of FIG. 1.

FIG. 13 is a side cross-sectional view of the dock assembly of the docking system of FIG. 1.

FIG. 14 is a side cross-sectional view of the dock assembly and the tablet cradle arm of the docking system of FIG. 1.

FIG. 15 is a front view of the dock housing of the dock assembly of the docking system of FIG. 1.

FIG. 16 is a side sectional view of the dock housing of FIG. 15.

FIG. 17 is a rear perspective view of the dock housing along line A-A in FIG. 16.

FIG. 18 is a rear view of the dock housing of FIG. 15.

FIG. 27 is a rear perspective view of the docking system of FIG. 1 with the cradle arm in a propping position.

DETAILED DESCRIPTION OF THE PREFERRED EMBODIMENTS

Figure 1:
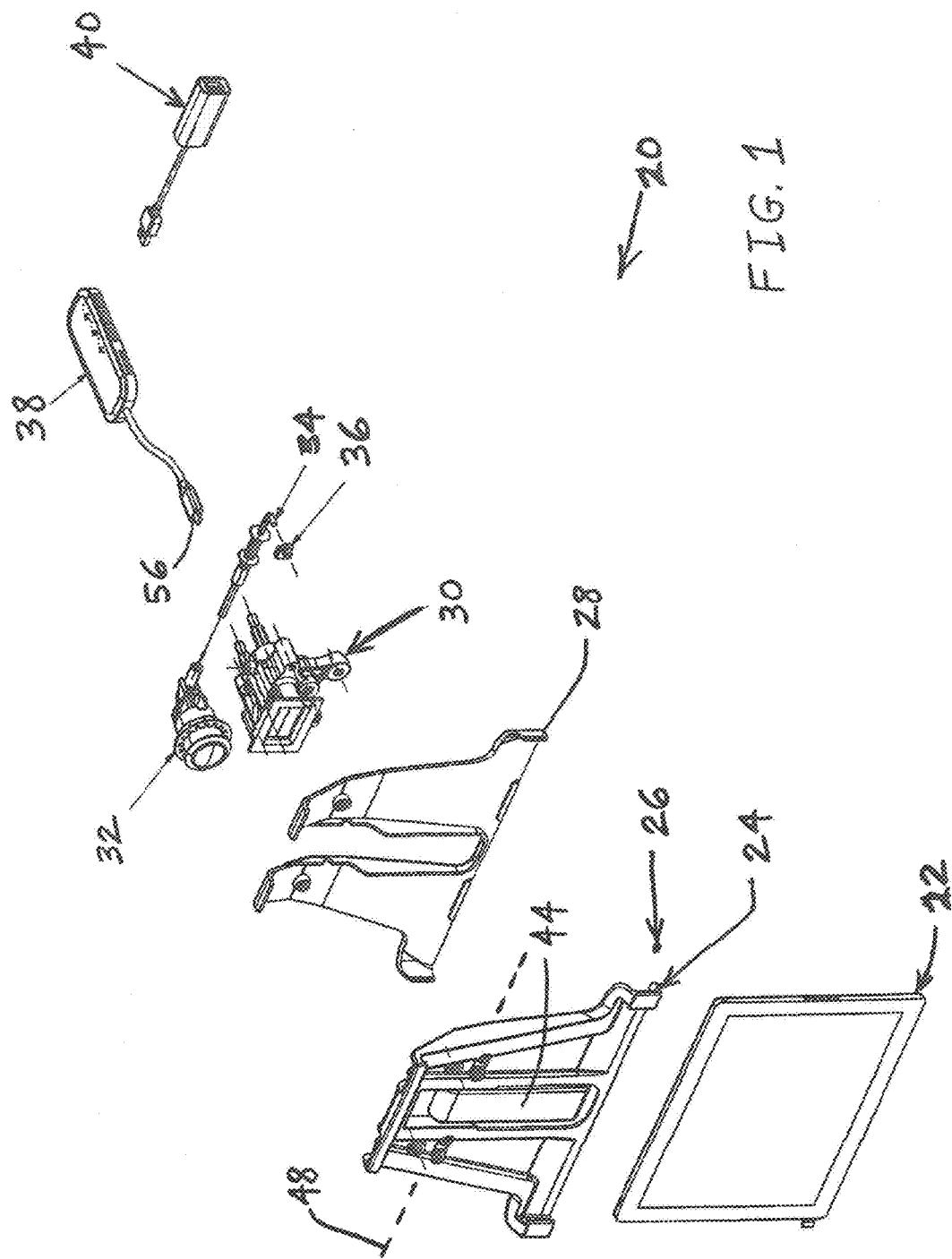
FIG. 1 is an exploded, perspective view of one embodiment of a docking system of the present invention.

FIG. 1 illustrates one embodiment of a docking system 20 of the present invention, including a tablet computer 22, a tablet cradle assembly 24, a conformable soft tip set screw 26, a cradle access cover 28, a dock assembly 30, a pushbutton release actuator 32, a release cable assembly 34, a cable retaining clip 36, a USB-C hub 38, and a USB-to-Ethernet adapter 40. Tablet cradle assembly 24 and cradle access cover 28 may securely retain tablet computer 22.

Figure 2:
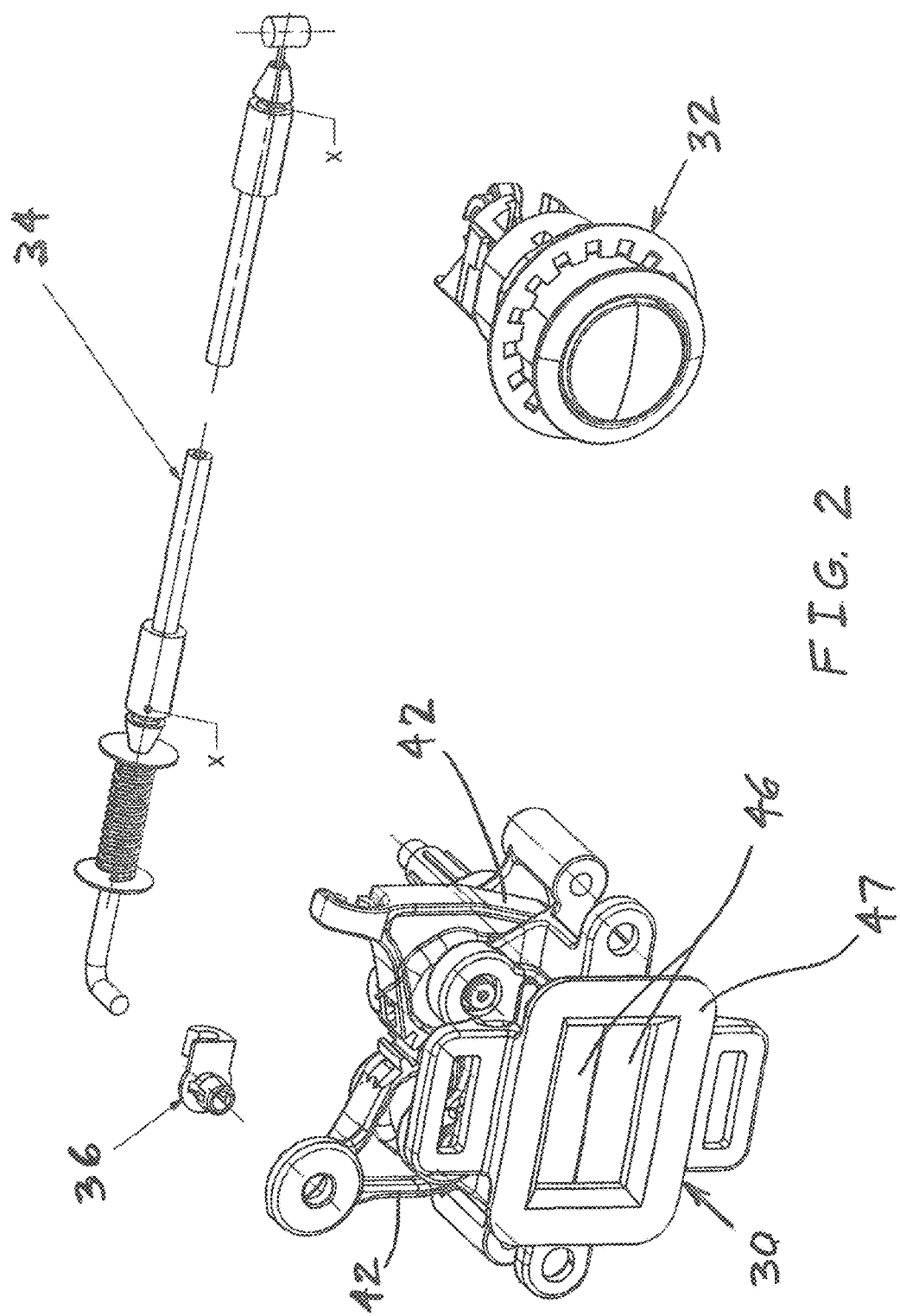
FIG. 2 is an enlarged, exploded, perspective view of the dock assembly, pushbutton release actuator, release cable assembly, and cable retaining clip of the docking system of FIG. 1.

FIG. 2 provides an enlarged view of dock assembly 30, pushbutton release actuator 32, release cable assembly 34, and cable retaining clip 36. Dock assembly 30 includes two opposing latch arms 42 that each latch onto a tablet cradle arm 44 of tablet cradle assembly 24 when tablet cradle arm 44 is inserted into shutters 46 of dock housing 47, as illustrated in more detail below.

Figure 3:
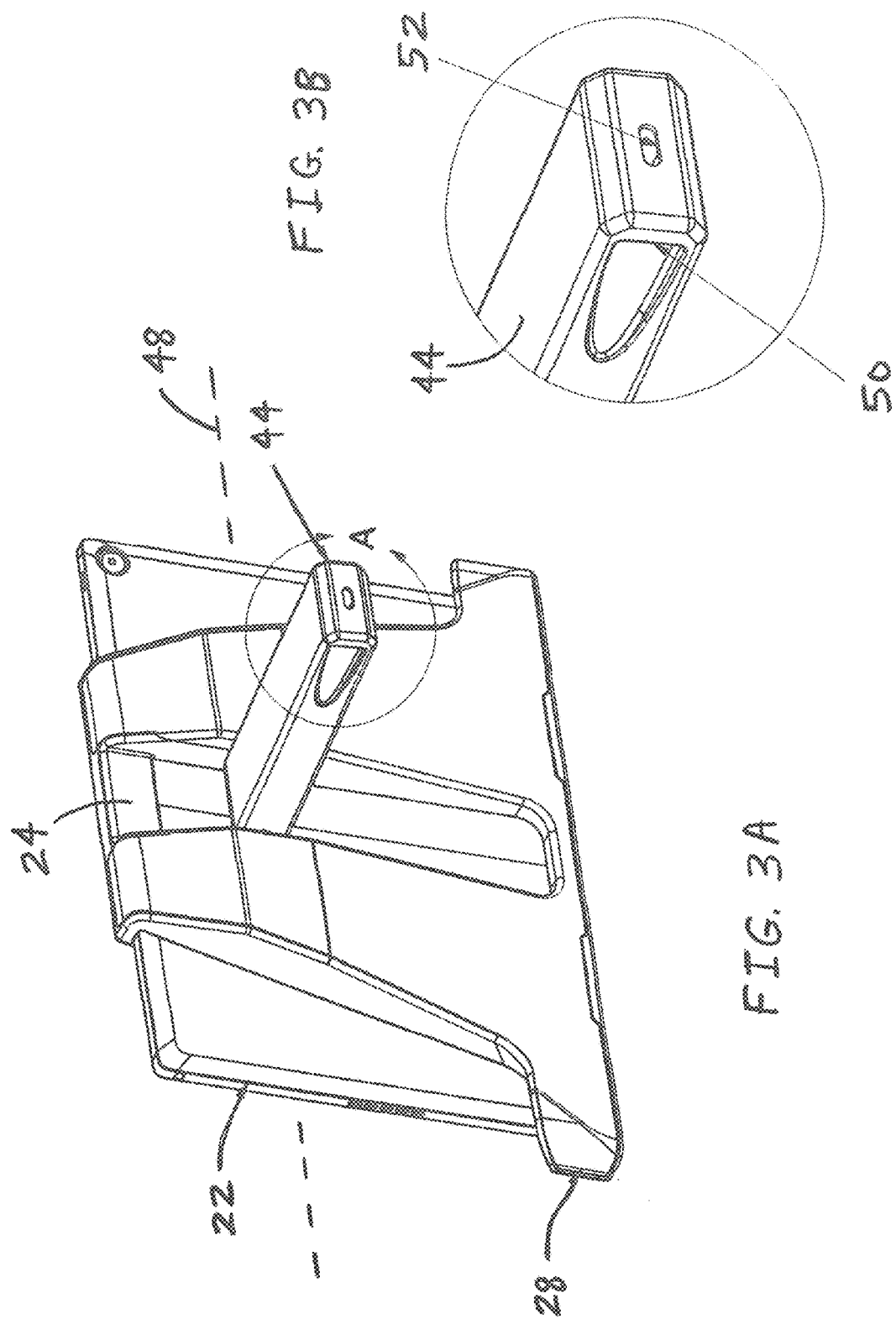
FIG. 3A is a rear perspective view of the tablet computer, tablet cradle assembly, and cradle access cover of the docking system of FIG. 1 in an assembled state.
FIG. 3B is an enlarged view of area A of FIG. 3A.

FIG. 3A illustrates tablet computer 22, tablet cradle assembly 24, and cradle access cover 28 with tablet cradle arm 44 in a rotated position for insertion through shutters 46. Tablet cradle arm 44 is pivotable about an axis 48 with respect to the remainder of tablet cradle assembly 24. Tablet cradle arm 44 is shown in FIG. 3A in a position rotated 90 degrees relative to its position in FIG. 1. Tablet cradle arm 44 may also be manually placed in a position rotated about 30 degrees relative to its position in FIG. 1 in order to prop up tablet computer 22 on a desk top (not shown) such that a screen of tablet computer 22 faces a user. In this propping position, tablet cradle arm 44 functions as a leg support for tablet computer 22.

As best shown in FIG. 3B, a distal end of tablet cradle arm 44 includes opposing latch engagement recesses or indentations 50 and a USB-C channel opening 52. Although only one indentation 50 is visible in FIG. 3B, a second indentation 50 is diametrically opposed on the opposite side of tablet cradle arm 44.

Figure 4:
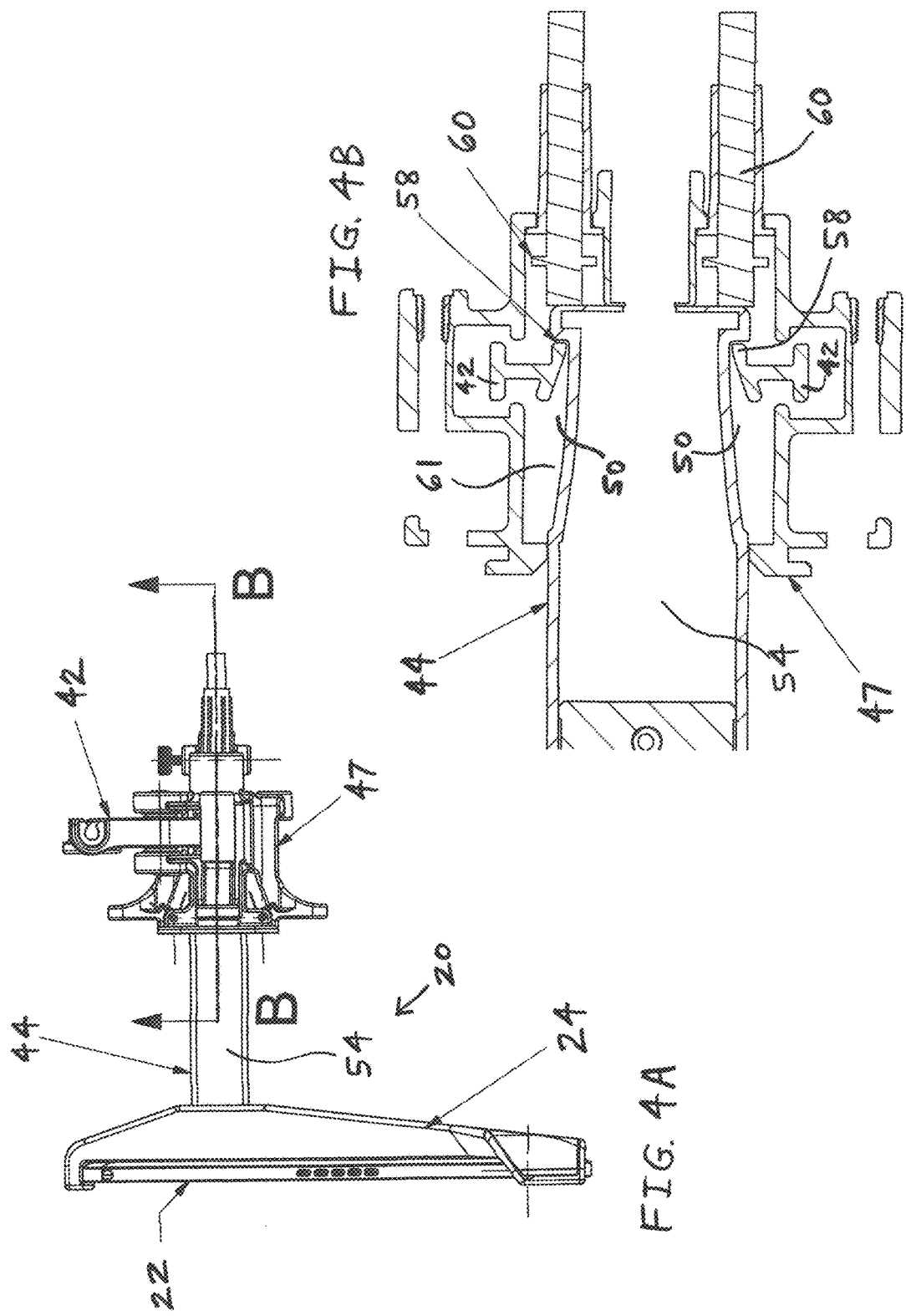
FIG. 4A is a side sectional view of the docking system of FIG. 1 in an assembled state.
FIG. 4B is an upward-facing sectional view along line B-B in FIG. 4A.

FIG. 4A illustrates docking system 20 in an assembled state. Tablet cradle arm 44 includes therein a channel 54 carrying a wiring harness (not shown) through which USB-C hub 38, and USB-to-Ethernet adapter 40 may be in communication with tablet computer 22. A male plug connector 56 of USB-C hub 38 may be electrically connected to the wiring harness through USB-C channel opening 52.

As shown in FIG. 4B, each of two distal ends 58 of latch arms 42 is received in a respective one of indentations 50 to thereby latch tablet cradle arm 44 in dock housing 47. Each of two plungers 60 is in a depressed position and exerts a biasing force on tablet cradle arm 44. The biasing force is in a direction such that it biases arm 44 out of the recess or cavity 61 of dock housing 47. That is, each of the two plungers 60 exerts an outward force on tablet cradle arm 44 such that tablet cradle arm 44 may be ejected or biased out of dock housing cavity 61 when latch arms 42 release tablet cradle arm 44 in response to pushbutton release actuator 32 being manually depressed by a user.

Figure 5:
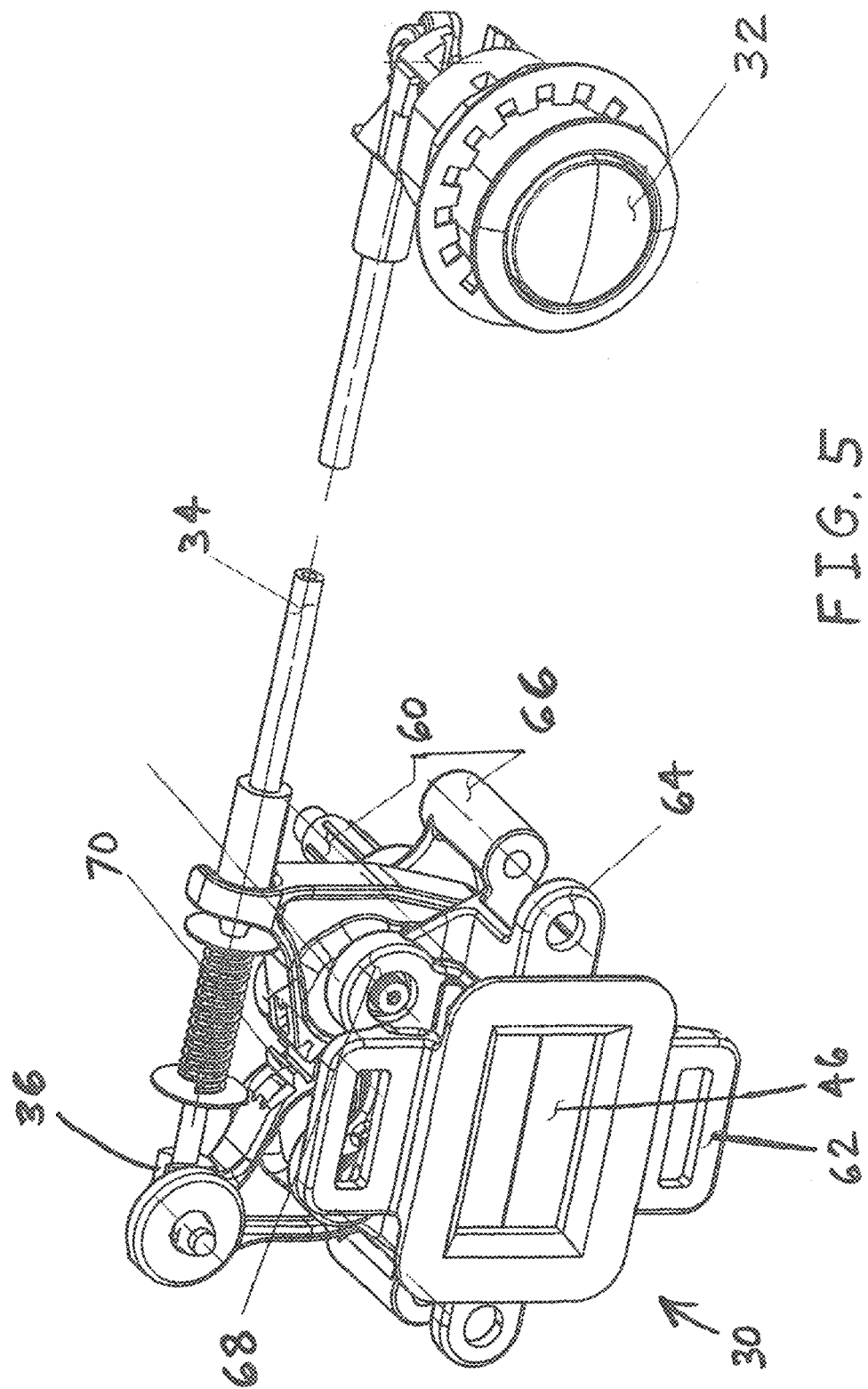
FIG. 5 is an enlarged, perspective view of the dock assembly, pushbutton release actuator, release cable assembly, and cable retaining clip of the docking system of FIG. 1.

FIG. 5 illustrates dock assembly 30, pushbutton release actuator 32, release cable assembly 34, and cable retaining clip 36 in an assembled state. Shutters 46 minimize the appearance of the dock when it is not in use, and make the dock less noticeable. Slots 62 are disposed above and below shutters 46 for receiving trim clips, reducing gaps, and securing dock housing 47 to the trim panel of the dashboard. Locating features 64 are disposed to the left and right of shutters 46 for aligning dock housing 47 with the trim panel. Threaded throughholes 66 on the left and right sides of dock housing 47 enable the substrate bracket to be easily secured. Ball bearings 68 reduce latch wear and smoothen operation. Gears 70 on the latches enable symmetric disengagement between latch arms 42. Each gear 70 may be attached to a respective one of latch arms 42. Gears 70 also enable the ejection signal, embodied in a pull of the cable in release cable assembly 34, to be connected to both latch arms 42. Torsion springs are associated with each latch arm, as described in more detail below, and gears 70 translate the latch spring force from one side to the other if one spring should fail. USB-C male plug 56 accepts or mates with a wide range of devices. Release cable assembly 34 translates the release force through a cable having a length suitable for the environment. Ejection plungers 60 aid in the unloading of tablet cradle arm 44 when the pushbutton of pushbutton release actuator 32 is depressed.

As shown in the exploded view of FIG. 6, dock assembly 30 includes four latch arm torsion springs 72, four dowel pins 74, four bearings 76, four shoulder screws 78, a thumb screw 80, a left-hand latch arm assembly 82, and a right-hand latch arm assembly 84. The teeth of gears 70 may be meshed together as shown before installation.

As shown in the exploded view of FIG. 7, left hand latch arm assembly 82 includes a latch-dock slam arm 86, a standoff 88, and a torsion spring 90. Similarly, right hand latch arm assembly 84 includes a latch-dock slain arm 92, a standoff 94, and a torsion spring 96.

FIG. 8 shows torsion spring 90 loaded onto latch-dock slam arm 86. FIG. 9 shows standoff 88 loaded through spring 90. The structure of right hand latch arm assembly 84 is substantially similar to that of left hand latch arm assembly 82, and thus is not described in more detail in order to avoid needless repetition.

FIG. 10 illustrates dock assembly 30 with the latch engaged. FIG. 11 illustrates dock assembly 30 with the latch disengaged as a result of pushbutton release actuator 32 being depressed. FIG. 12 illustrates pushbutton release actuator 32.

FIG. 13 illustrates dock assembly 30 in an unloaded state, i.e., without tablet cradle arm 44 received therein. FIG. 14 illustrates dock assembly 30 in a loaded state, i.e., with tablet cradle arm 44 received therein.

FIGS. 15, 16 and 18 illustrate dimensions (in millimeters) of a specific embodiment of dock housing 47. A heat set threaded insert 98 retains male USB-C plug connector 56. A threaded insert may be received in optional location 100. FIG. 17 illustrates the locations at which threaded inserts 98 may be received in dock housing 47.

Figure 20:
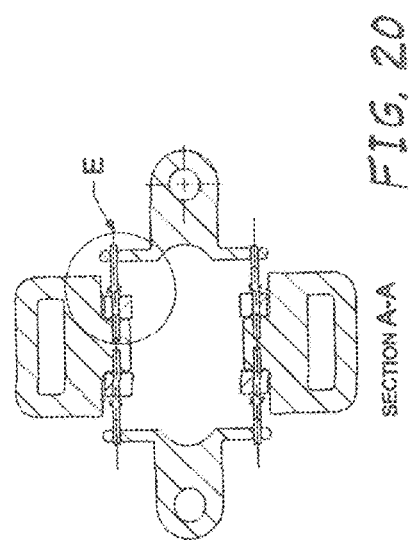
FIG. 20 is a front cross-sectional view along line A-A of FIG. 19.
Figure 21:
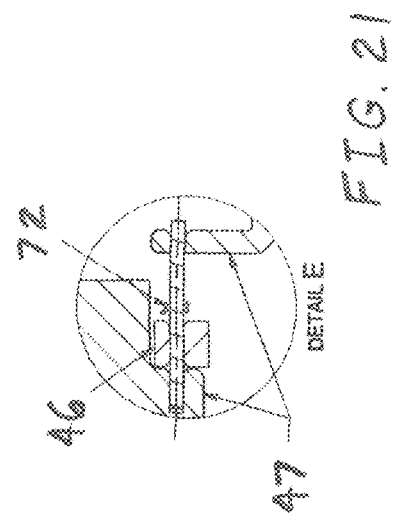
FIG. 21 is an enlarged view of area E in FIG. 20.
Figure 19:
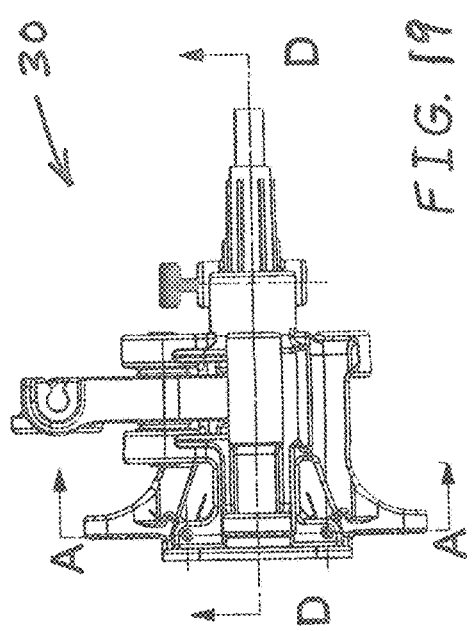
FIG. 19 is a side cross-sectional view of the dock assembly of the docking system of FIG. 1.
Figure 22:
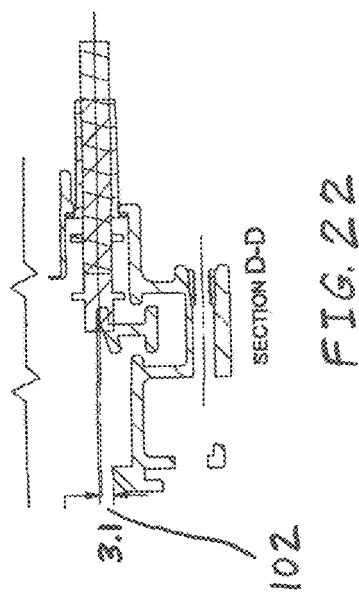
FIG. 22 is a lower cross-sectional view along line D-D of FIG. 19.

FIG. 19 is a side cross-sectional view of dock assembly 30. FIG. 20 is a front cross-sectional view along line A-A of FIG. 19. FIG. 21 illustrates housing 47, shutter 46, and shutter spring 72 in more detail. FIG. 22 is a lower cross-sectional view along line D-D of FIG. 19, illustrating a latch engagement dimension 102.

Figure 24:
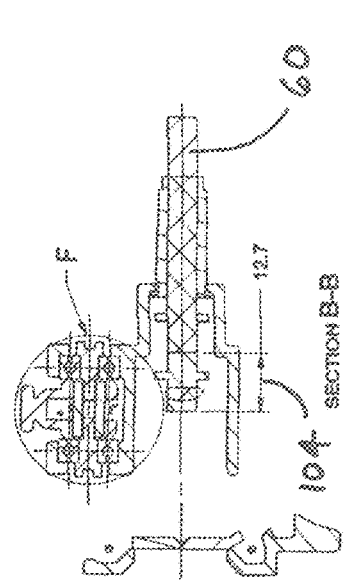
FIG. 24 is a side cross-sectional view along line B-B of FIG. 23.
Figure 25:
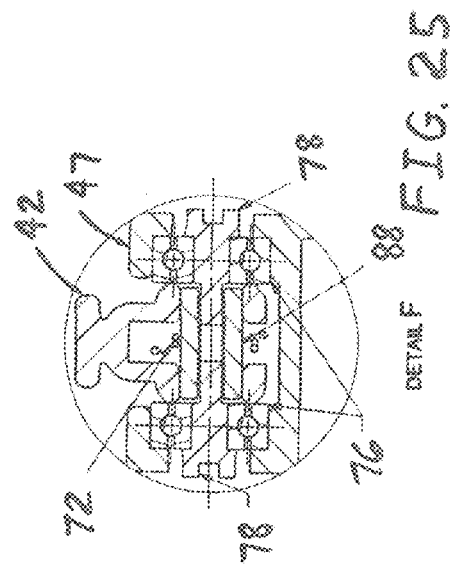
FIG. 25 is an enlarged view of area F in FIG. 24.
Figure 23:
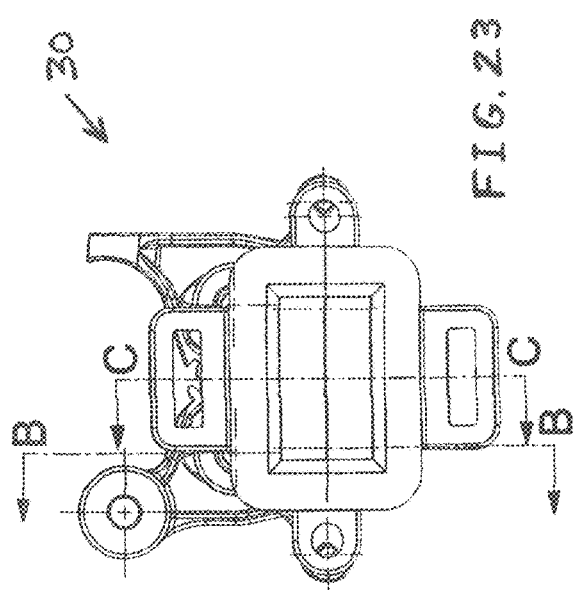
FIG. 23 is a front view of the dock assembly of the docking system of FIG. 1.
Figure 26:
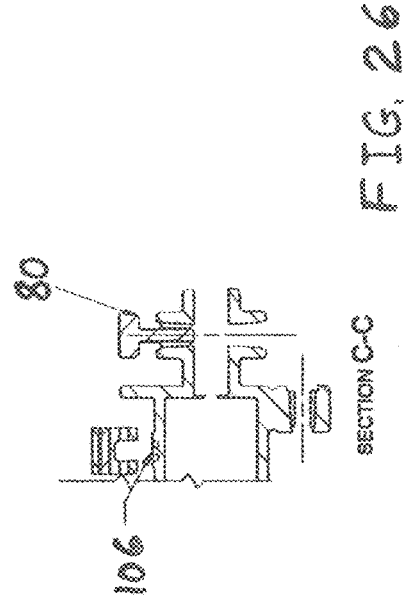
FIG. 26 is a side cross-sectional view along line C-C of FIG. 23.

FIG. 23 is a front view of the dock assembly of the docking system of FIG. 1. FIG. 24 is a side cross-sectional view along line B-B of FIG. 23, illustrating a travel distance 104 of ejection plunger 60. FIG. 25 is an enlarged view of area F in FIG. 24. FIG. 26 is a side cross-sectional view along line C-C of FIG. 23, illustrating latch spring guides 106.

FIG. 27 illustrates docking system 20 with tablet cradle arm 44 in a propping position in which tablet cradle arm 44 supports tablet computer 22 on a desk top 108 such that a display screen of tablet computer 22 faces the head of a human user sitting at the desk. In this position, tablet cradle arm 44 is oriented at an angle of about 30 degrees relative to a back surface of cradle access cover 28.

The foregoing description may refer to "motor vehicle", "automobile", "automotive", or expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A docking system for docking an electronic device in a motor vehicle, the docking system comprising:
    a cradle including a pivotable arm having an internal channel, the cradle being configured to securely retain the electronic device;
    a dock housing including a recess receiving the arm of the cradle:
a latch releasably latching the arm of the cradle within the recess of the dock housing; and
    a release actuator mechanically coupled to the latch via a cable and configured to release the arm of the cradle from the latch in response to the release actuator being manually actuated.

2. The system of claim 1 wherein a distal end of the arm includes a throughhole in communication with the internal channel.

3. The system of claim 1 further comprising a plunger exerting a biasing force on the arm of the cradle, the biasing force being in a direction to bias the arm out of the recess of the dock housing.

4. The system of claim 1 wherein the arm of the cradle is pivotable to a propping position in which the arm of the cradle is configured to support the electronic device on a desk top such that a user interface of the electronic device faces a user sitting at the desk.

5. A docking system for docking an electronic device in a motor vehicle, the docking system comprising:
    a cradle including a pivotable arm having an internal channel, the cradle being configured to securely retain the electronic device, wherein opposite sides of a distal end of the arm of the cradle each have a respective indentation;
    a dock housing including a recess receiving the arm of the cradle;
    two latch arms releasably latching the arm of the cradle within the recess of the dock housing, each latch arm being received in a respective one of the indentations; and
    two gears, each said gear being attached to a respective one of the latch arms, teeth of the two gears being intermeshed with each other.

6. An automotive docking system for docking an electronic device in a motor vehicle, the docking system comprising:
    a cradle including an arm having an internal channel, a distal end of the arm including a throughhole in communication with the internal channel, the throughhole having a first width that is less than a second width of the channel, the cradle being configured to securely retain the electronic device, wherein opposite sides of the distal end of the arm of the cradle each have a respective indentation;
    a dock housing including a recess receiving the arm of the cradle;
    two latch arms releasably latching the arm of the cradle within the recess of the dock housing, each latch arm being received in a respective one of the indentations; and
    two gears, each said gear being attached to a respective one of the latch arms, teeth of the two gears being intermeshed with each other.

7. The system of claim 6 further comprising a pushbutton release actuator mechanically coupled to the latch and configured to release the arm of the cradle from the latch in response to the pushbutton release actuator being manually actuated.

8. The system of claim 6 further comprising a plunger exerting a biasing force on the arm of the cradle, the biasing force being in a direction to bias the arm out of the recess of the dock housing.

9. The system of claim 6 wherein the arm of the cradle is pivotable to a propping position in which the arm of the cradle is configured to support the electronic device on a desk top such that a user interface of the electronic device faces a user sitting at the desk.

10. A docking system for docking an electronic device in a motor vehicle, the docking system comprising:
    a cradle including an arm having an internal channel, the cradle being configured to securely retain the electronic device, wherein opposite sides of a distal end of the arm of the cradle each have a respective indentation;
    a dock housing including a recess receiving the arm of the cradle:
    two latch arms latching the arm of the cradle within the recess of the dock housing, each latch arm being received in a respective one of the indentations;
    a release actuator mechanically coupled to the latch arms and configured to release the arm of the cradle from the latch arms in response to the release actuator being manually actuated; and
    two gears, each said gear being attached to a respective one of the latch arms, teeth of the two gears being intermeshed with each other.

11. The system of claim 10 further comprising a plunger exerting a biasing force on the arm of the cradle, the biasing force being in a direction to bias the arm out of the recess of the dock housing.

12. The system of claim 10 wherein the arm of the cradle is pivotable to a propping position in which the arm of the cradle is configured to support the electronic device on a desk top such that a user interface of the electronic device faces a user sitting at the desk.

* * * * *